United States Patent
Poole (10) Patent No.: US 7,921,932 B2
(45) Date of Patent: Apr. 12, 2011

(54) IMPLEMENT FRAME WITH FRONT FOLDING WINGS AND TRANSPORT WHEELS

(75) Inventor: Gerald W. Poole, Plainfield, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/276,219

(22) Filed: Nov. 21, 2008

(65) Prior Publication Data

US 2010/0126744 A1    May 27, 2010

(51) Int. Cl.
*A01B 49/00*    (2006.01)
(52) U.S. Cl. .................................. 172/311; 172/456
(58) Field of Classification Search .............. 172/311, 172/456, 466; 56/228, 134, 159; 111/54, 111/55, 57, 118, 130, 200; 182/69.1
See application file for complete search history.

(56) References Cited

U.S. PATENT DOCUMENTS

| | | | |
|---|---|---|---|
| 2,818,296 A | 12/1957 | Northcote et al. | |
| 3,333,645 A | 8/1967 | Gustafson | |
| 3,481,408 A | 12/1969 | Twidale | |
| 3,521,905 A | 7/1970 | Tasset et al. | |
| 3,608,645 A * | 9/1971 | Meiners | 172/491 |
| 3,791,673 A | 2/1974 | Hornung | |
| 4,137,852 A | 2/1979 | Pratt | |
| 4,171,022 A * | 10/1979 | Applequist | 172/311 |
| 4,364,581 A | 12/1982 | Shoup | |
| 4,387,772 A | 6/1983 | Bourgault | |
| 4,504,076 A | 3/1985 | Bedney | |
| 4,596,290 A | 6/1986 | Bedney | |
| 4,944,355 A | 7/1990 | Karchewski | |
| 4,945,997 A | 8/1990 | Adee | |
| 5,024,279 A | 6/1991 | Warner et al. | |
| 5,062,489 A | 11/1991 | Adee | |
| 5,113,956 A | 5/1992 | Friesen et al. | |
| 5,488,996 A | 2/1996 | Barry et al. | |
| 5,497,837 A | 3/1996 | Kehrney | |
| 5,647,440 A | 7/1997 | Barry et al. | |
| 5,839,516 A | 11/1998 | Arnold et al. | |
| 6,076,613 A | 6/2000 | Fraiser | |
| 6,082,467 A | 7/2000 | Friesen | |
| 6,112,827 A | 9/2000 | Reiber et al. | |
| 6,167,972 B1 | 1/2001 | Hundeby et al. | |
| 6,408,950 B1 * | 6/2002 | Shoup | 172/311 |
| 6,494,154 B2 * | 12/2002 | Kinzenbaw et al. | 111/54 |
| 6,502,645 B1 | 1/2003 | Brueggen et al. | |
| 6,609,574 B1 | 8/2003 | Collins et al. | |
| 6,666,010 B2 * | 12/2003 | Beaufort et al. | 56/228 |

(Continued)

OTHER PUBLICATIONS www.johndeere.com; Brochure; 1770NT Planter Family, p. 16-19.

(Continued)

*Primary Examiner* — Robert E Pezzuto
*Assistant Examiner* — Matthew D Troutman
(74) *Attorney, Agent, or Firm* — Rebecca Henkel (57) ABSTRACT

An agricultural implement arrangement is disclosed that may provide wheel assemblies that are stored in front of wing assemblies and row units mounted thereon. The arrangement may include actuators to extend the wheel assemblies in order to lift the row units off the ground to move to a transport position. When in a fully-folded position, the wing wheel assemblies may interleave. The arrangement may also shift the weight of the wing assemblies while in transport position to the hitch of the tractor and center the rearward weight over the central wheel assembly.

22 Claims, 6 Drawing Sheets

U.S. PATENT DOCUMENTS

| | | | |
|---|---|---|---|
| 6,666,155 B2 | 12/2003 | Paluch et al. | |
| 6,702,035 B1 | 3/2004 | Friesen | |
| 6,902,010 B2 * | 6/2005 | Shoup | 172/456 |
| 6,935,254 B2 | 8/2005 | Ostrander | |
| D559,868 S * | 1/2008 | Nanlawala et al. | D15/27 |
| 2001/0011595 A1 | 8/2001 | Friggstad | |
| 2002/0043194 A1 * | 4/2002 | Kinzenbaw et al. | 111/54 |
| 2004/0050563 A1 | 3/2004 | Shoup | |
| 2004/0079264 A1 | 4/2004 | Mayerle et al. | |
| 2004/0149464 A1 * | 8/2004 | Arnett | 172/311 |
| 2005/0087350 A1 | 4/2005 | Bauer | |
| 2006/0090910 A1 * | 5/2006 | Houck | 172/272 |
| 2007/0163791 A1 * | 7/2007 | Meek | 172/311 |
| 2010/0126742 A1 | 5/2010 | Poole | |
| 2010/0126743 A1 | 5/2010 | Poole et al. | |

OTHER PUBLICATIONS

U.S. Appl. No. 12/276,202, filed Nov. 21, 2008; Applicants: Gerald W. Poole et al.; Entitled: Implement Frame with Front Folding Wings and Transport Wheels.

U.S. Appl. No. 12/276,213, filed Nov. 21, 2008; Applicants: Gerald W. Poole et al.; Entitled: Implement Frame with Front Folding Wings and Transport Wheels.

* cited by examiner

IMPLEMENT FRAME WITH FRONT FOLDING WINGS AND TRANSPORT WHEELS

BACKGROUND

The present invention relates generally to the field of agricultural implements, such as planters and other wide, foldable implements towed behind a work vehicle, such as a tractor.

A wide range of farm implements have been developed and are presently in use for tilling, planting, harvesting, and so forth. Seeders or planters, for example, are commonly towed behind tractors and may cover wide swaths of ground which may be tilled or untilled. Such devices typically open the soil, dispense seeds in the opening, and reclose the soil in a single operation. Seeds are commonly dispensed from seed tanks and distributed to row units by a distribution system. To make the seeding operation as efficient as possible, very wide swaths may be covered by extending wings on either side of a central section of the implement pulled by the tractor. Included in the wing assemblies are tool bars, row units mounted thereon, and support wheels. The wings and row units are commonly disposed in a "floating" arrangement during the planting operation, wherein hydraulic cylinders allow the implement to contact the soil with sufficient force to open the soil, dispense the seeds and close the soil. For transport, the wings may be elevated by the support wheels to disengage the row units from the ground and folded forward to reduce the width of the implement.

The central section of the implement may also contain support wheels that are extended when in a transport position. For wide implements incorporating a central section, wings, and row units of the type described above, the support wheels add complexity to the assembly and limit the available configurations of row units.

BRIEF DESCRIPTION

The disclosure provides an innovative arrangement for transporting agricultural implements, particularly for transitioning from a planting to a transport position. The disclosure may be used in a wide range of settings, but is particularly well-suited for implements such as seeders, planters, discs, plows, and so forth in which winged extensions can be folded forward by mechanisms after the wings and attached row units are raised from contact with the ground. In one particular embodiment, for example, the present embodiments may provide wheel assemblies that are stored in front of the row units so as not to affect crop row spacing. The arrangement may then provide for actuators to extend the wheel assemblies in order to lift the row units off the ground to move to a transport position. When in a fully-folded position, the wing and wheel assemblies may be arranged to interleave, in order to minimize width of the implement in transport position. The arrangement may also provide improved stability and load balancing by shifting the weight of the implement while in transport position.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As discussed in detail below, various configurations of agricultural implement systems may be employed to improve control over implements during transport and to increase flexibility during seeding. In particular, when in a planting or ground engaging position, portions of wing support wheels, related actuators, and assemblies are positioned between the wing row units. This arrangement affects and increases the minimum spacing between row units, thereby increasing the overall planter width and limiting crop row spacing for operators. Moreover, when the wings are folded forward in a transport position, the weight of the implement may be shifted as wheels are extended, placing an unbalanced load on the tractor hitch and causing stress on the folding mechanism. For example, the embodiments discussed below may employ a support wheel assembly on each wing to be positioned in front of the tool bar when retracted while the row units are engaged in the ground. Further, a central wheel assembly may be stored in front of wing tool bars and may be extended or deployed, raising the implement system when the wings are folded forward. In an embodiment, the wings may fold forward, where the wings will couple or lock to a tow bar, the wing wheel assembly may then be retracted, thereby interleaving the wing support wheels and improving weight distribution during transport.

Figure 1:
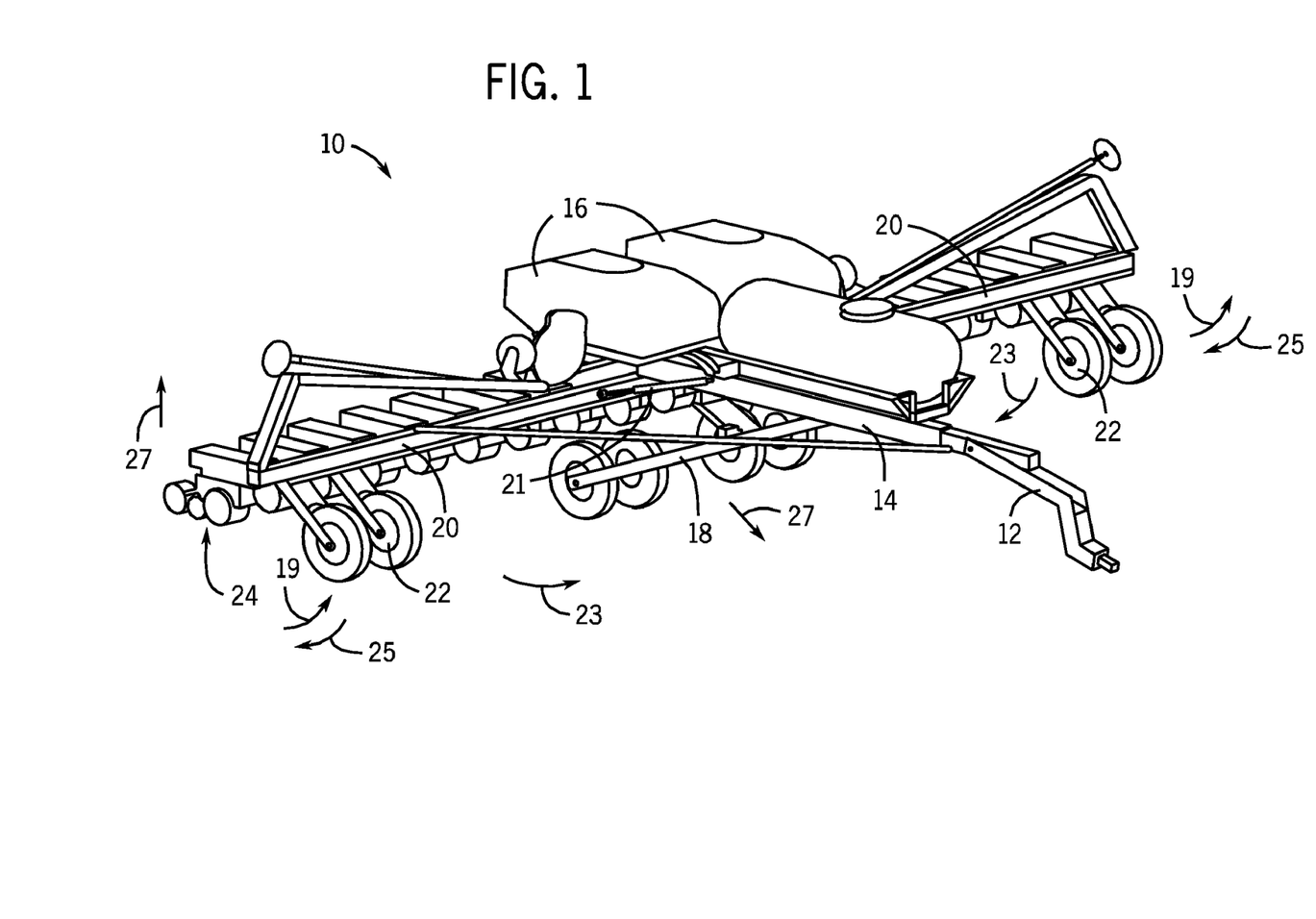
FIG. 1 is a perspective views of an embodiment of an agricultural implement, e.g., a planter, in a planting position, wherein the implement includes a central portion and wing assemblies that can be folded forward to transport position.

Turning now to the drawings and referring first to FIG. 1, an agricultural implement 10 is illustrated in the form of a planter. The implement is designed to be towed behind a work vehicle such as a tractor. The implement includes planter hitch assembly 12 which is attached to tow bar 14. Planter hitch assembly 12 may be used to attach planter 10 to a tractor and may be pivotally coupled to tow bar 14 to allow flexibility as the planter implement changes elevation as it is towed across a terrain. Also supported by tow bar 14 are seed tanks 26 and other planter apparatus such as a liquid fertilizer container. Central wheel assembly 18 is disposed below and coupled to tow bar 14. Central wheel assembly 18 may include an actuator that extends the assembly to a transport or deployed position. Further, central wheel assembly 18 may also be retracted when the planter is in a planting or ground engaging position.

Wing tool bars 20 are coupled to and extend transversely on each side of tow bar 14. Wing tool bars 20 are pivotally coupled to tow bar 14 enabling wing tool bars 20 to fold forward, shown by arrow 23, when the planter 10 is in a compacted transport position. When in transport position, wing tool bars 20 are generally perpendicular to tow bar 14. Wing wheel assemblies 22 are used to lift tool bars 20, thereby enabling planter 10 to move to a transport position. Wing wheel assemblies 22 may be retracted 19 or extended 25 to move the wing tool bars from ground engaging position to transport position, respectively. As the wing wheel assemblies 22 are extended or deployed 25, row units 24 are elevated 27 above contact with the ground, thereby removing the planter 10 from the planter position. Actuators 21, such as hydraulic cylinders, removed from the figure to enhance clarity, may be attached to tow bar 14 and each wing tool bar 20 to facilitate the folding of wing tool bars 20. One or more wing actuators 21 may be attached to each of the two wing tool bars 20 in order to control the wings. The wing actuators 21 may be connected on each end, to the tow bar 14 and each wing tool bar 20, by pins or other pivoting means. In the embodiment, row units 24 are only mounted on wing tool bars 20 and there is no central tool bar between the wing tool bars. Row units 24 are only mounted on the two wing tool bars 20.

In an embodiment, wing wheel assemblies 22 may be extended while wing tool bars 20 are folded forward toward tow bar 14. When the wing tool bars 20 are fully folded, they may be elevated over tow bar 14. Wing wheel assemblies 22 may then be retracted, enabling the wing tool bars 20 to lock to tow bar 14, and enabling the wheels to interleave, thereby reducing the overall width of the planter 10 when in a compacted transport position. As wing wheel assemblies 22 are retracted, central wheel assembly 18 may be extended in direction 27, to elevate the implement 10 in transport mode. As discussed below, when interleaved, the wing wheel assemblies 22 include at least one opposing tool bar wheel adjacent to that wing's wheel. This position is referred to as the compacted transport position. The wheel assemblies 22 from opposite sides face one another in staggered positions as the tool bars 20 fold toward one another, as shown by arrow 23. Eventually the wheel assemblies 22 are at least partially or entirely overlapping in a row, parallel to the tow bar 14, where the wheel assemblies 22 alternate from the left bar 20 to the right bar 20 (See FIGS. 2 and 4).

Also attached to wing tool bars 20 are wing row units 24. Wing tool bars 20 support the row units 24 designed to dispense seeds along parallel rows and at a desired spacing in a field. Depending upon the design of the row units and upon such factors as the nature of the field (e.g., tilled or untilled), each row unit may serve a variety of functions and may have structures designed for these functions. Such structures may include, for example, an opening disc, a metering system, a covering disc, a firming wheel, a fertilizer dispenser, and so forth. Recipients or hoppers may be mounted on the framework of each row unit for receiving seeds, fertilizer or other materials to be dispensed by the row units. In the present embodiment, a distribution system serves to communicate seeds from the seed tanks to the various row units.

When wing wheel assemblies 22 are extended in a downward and rearward direction 25 to an extended position, wing row units 24 are lifted so as not to be in contact with the ground below. Moreover, central wheel assembly 18 may also be extended downward and forward 27, toward the tractor, to an extended position, further lifting row units 24. Wing tool bars 20 may be folded forward 23 while wing row units 24 are elevated, enabling wing tool bars 20 to fold inward toward tow bar 14.

When wing tool bars 20 are folded completely forward, wing wheel assemblies 22 may be raised 19 and retracted 25 in order to enable wing tool bars 20 to be secured to tow bar 14 or hitch assembly 12, thereby relieving the load sustained by the wing actuators 21. For example, wing wheel assemblies 22 may raise the wings high enough to allow the wings to be above the planter hitch assembly 12 when fully folded, and then lower the assemblies onto and lock or couple to the hitch assembly 12. In the embodiment, central wheel assembly 18 may be fully extended 27 to the deployed or transport position, lifting wing wheel assemblies 22 out of ground contact when the wing tool bars 20 are completely folded forward, shown by arrow 23. As central wheel assembly 18 is extended, the placement of seed tanks 26 on the implement 10 is used to improve stability of the implement, thereby increasing mobility. For instance, when the central wheel assembly 18 is extended, the load of seed tanks 16 may be shifted rearward from planter hitch assembly 12, further reducing the load and stress on the hitch assembly 12. This shifting of the seed tanks 16 rearward may be accomplished by any suitable mechanism, such as the illustrated hydraulics assembly 29 (see FIG. 3). The position of central wheel assembly 18 beneath seed tanks 26 may increase stability of the implement 10 during transport.

When in a transport position, central wheel assembly 18 may be extended 27 from tow bar 14 in a scissor motion forward and downward. The geometry of the central wheel assembly 18 is such that as the assembly is deployed and retracted, it does so with members arranged in a scissor-type configuration. That is, when retracted, the members may fold onto one another, and when deployed or extended, the members are spread apart to extend the assembly 18 and wheels, thereby lifting the planter 10. This is illustrated in greater detail in FIG. 6.

In a folded and compacted transport position, the individual wheels of wheel assemblies 22 may interleave (see FIGS. 2 and 4), thereby reducing the overall transport width of planter 10. In the present embodiment, central wheel assembly 18 may be extended in a scissor-type motion downward, shown by arrow 27, to a transport position. Also supported by tow bar 14, are seed tanks 26 and other planter apparatus such as a liquid fertilizer container.

Figure 2:
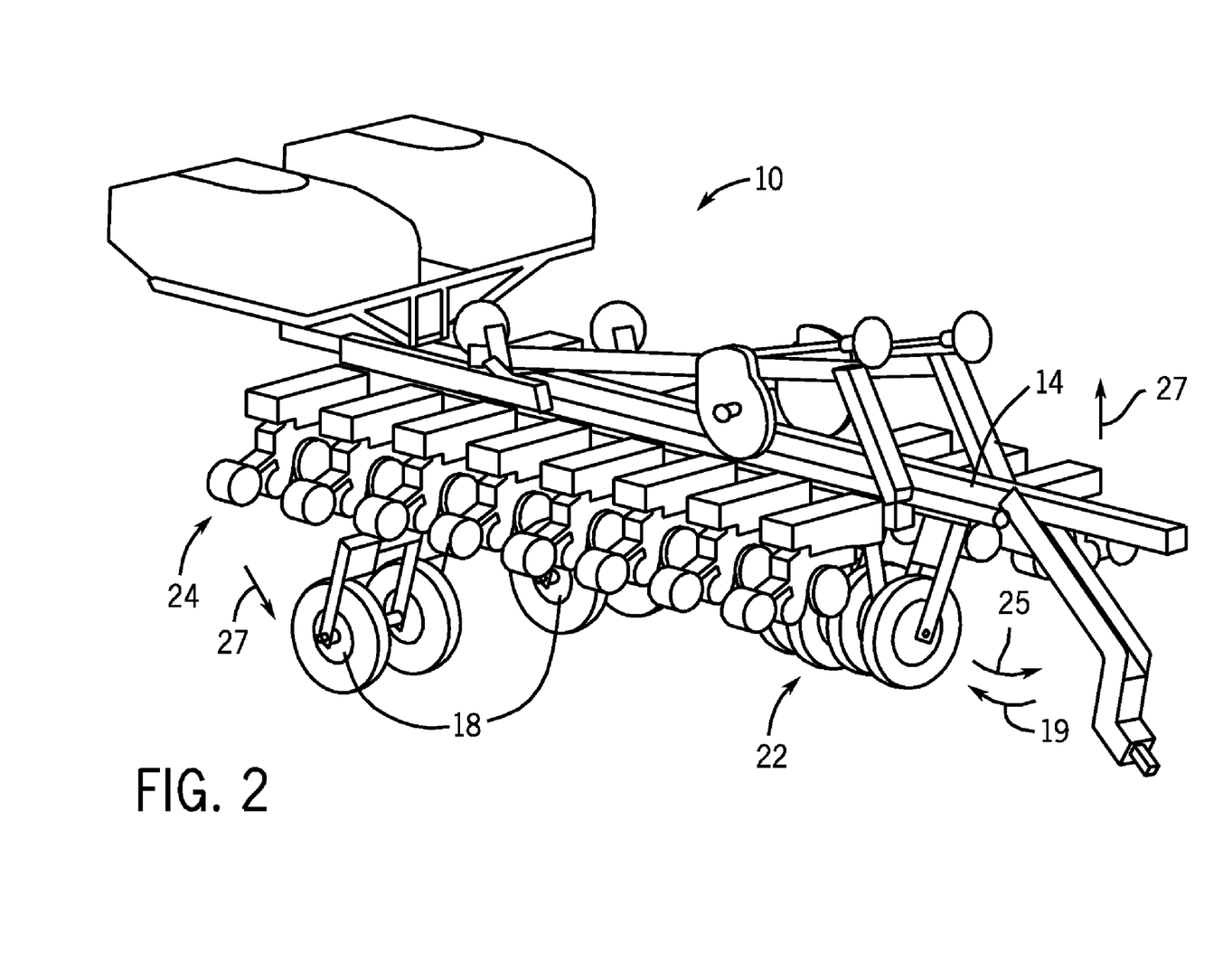
FIG. 2 is a perspective view of an embodiment of the agricultural implement in a transport position, illustrating the wing assemblies in a folded forward position.

The compacted transport position of an embodiment of planter implement 10 is depicted in FIG. 2. Included in planter implement 10 are tow bar 14, wing wheel assemblies 22, wing row units 24, and central wheel assembly 18. When in transport position, central wheel assembly 18 is extended or deployed 27 and row units 24 are elevated 27 out of contact with the ground below, increasing clearance of the implement.

Figure 3:
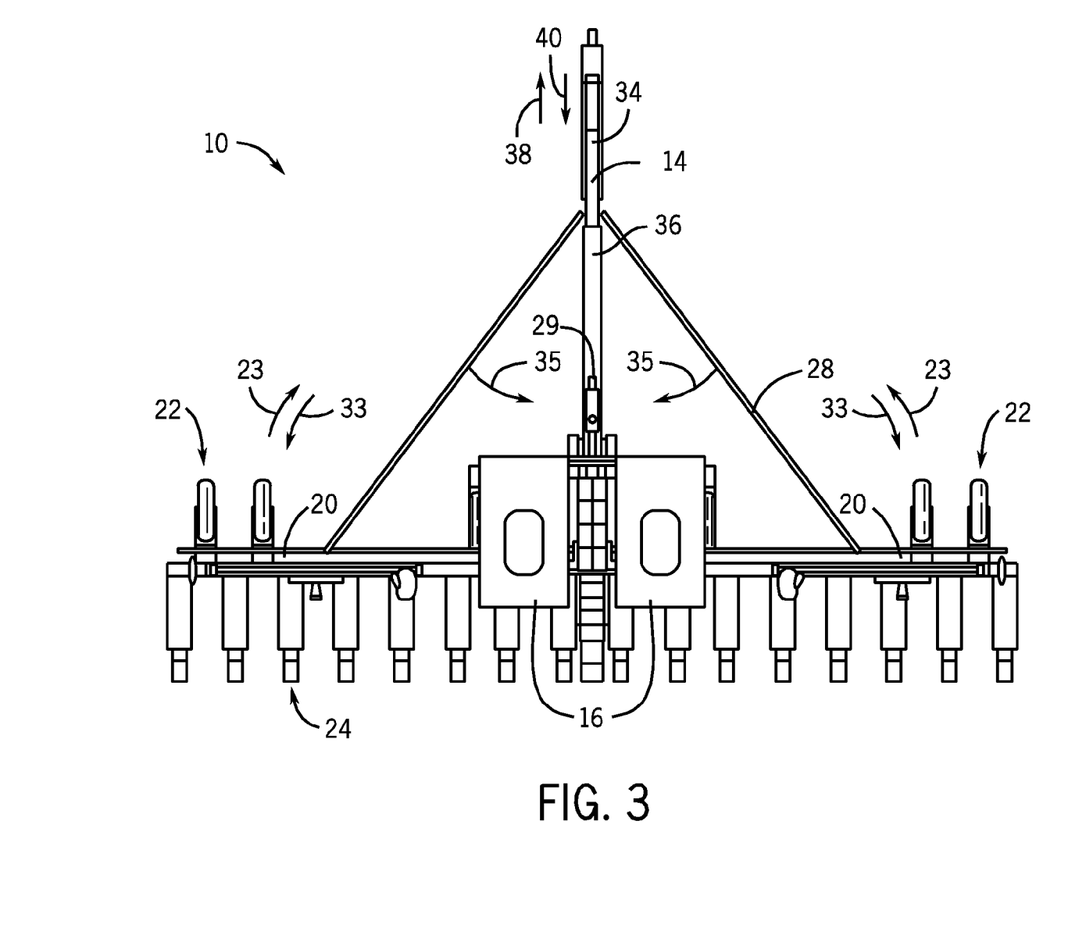
FIG. 3 is a top view of an embodiment of the agricultural implement in a planting position.

FIG. 3 shows a top view of an embodiment of planter implement 10 in the planting position. Draft tubes 28 are shown, which are connected to tow bar 14, as well as each of wing tool bars 20. Wing tool bars 20 fold forward 23, draft tubes 28 collapse inward 35 toward tow bar 14 due to the fact that draft tubes 28 are mounted to a telescoping portion 34 of tow bar 14. The telescoping portion 34 of tow bar 14 is utilized to extend 38 tow bar 14 when transitioning to a fully-folded or compacted transport position (See FIG. 4). That is, as the wing assemblies 20 are folded forward, in direction 23, the upper portion of draft tubes 32 and telescoping portion 34 move in direction 38, away from outer portion 36, drawing the draft tubes inward, indicated by arrow 35. The telescoping extension of tow bar 14 provides clearance for the wing components that come together when the planter 10 is in a transport position. Further, the telescoping portion of the tow bar 14 retracts to allow for reduced overall implement length when the wing tool bars 20 are extended and the planter is in a ground engaging position, improving maneuverability. Also illustrated are wing row units 24 mounted behind wing tool bars 20. When wing row units 24 are in a ground engaging position, wing wheel assemblies 22 are forward of wing tool bars 20. This arrangement for wing wheel assemblies 22 improves the flexibility in placement of the row units on the tool bars. For example, because wing wheel assemblies are not retracted between the row units, the spacing between wing row units 24 may be reduced, thereby increasing the density of seeding in a field. In the embodiment, there are eight wing row units 24 located on each of the wing tool bars 20. The number and configuration of row units may vary depending on application, cost, and physical factors. Row units 24 may be raised from contact with the ground when the central wheel assembly 18 and/or wing wheel assemblies 22 are extended shown by 27 and 25, respectively.

Figure 4:
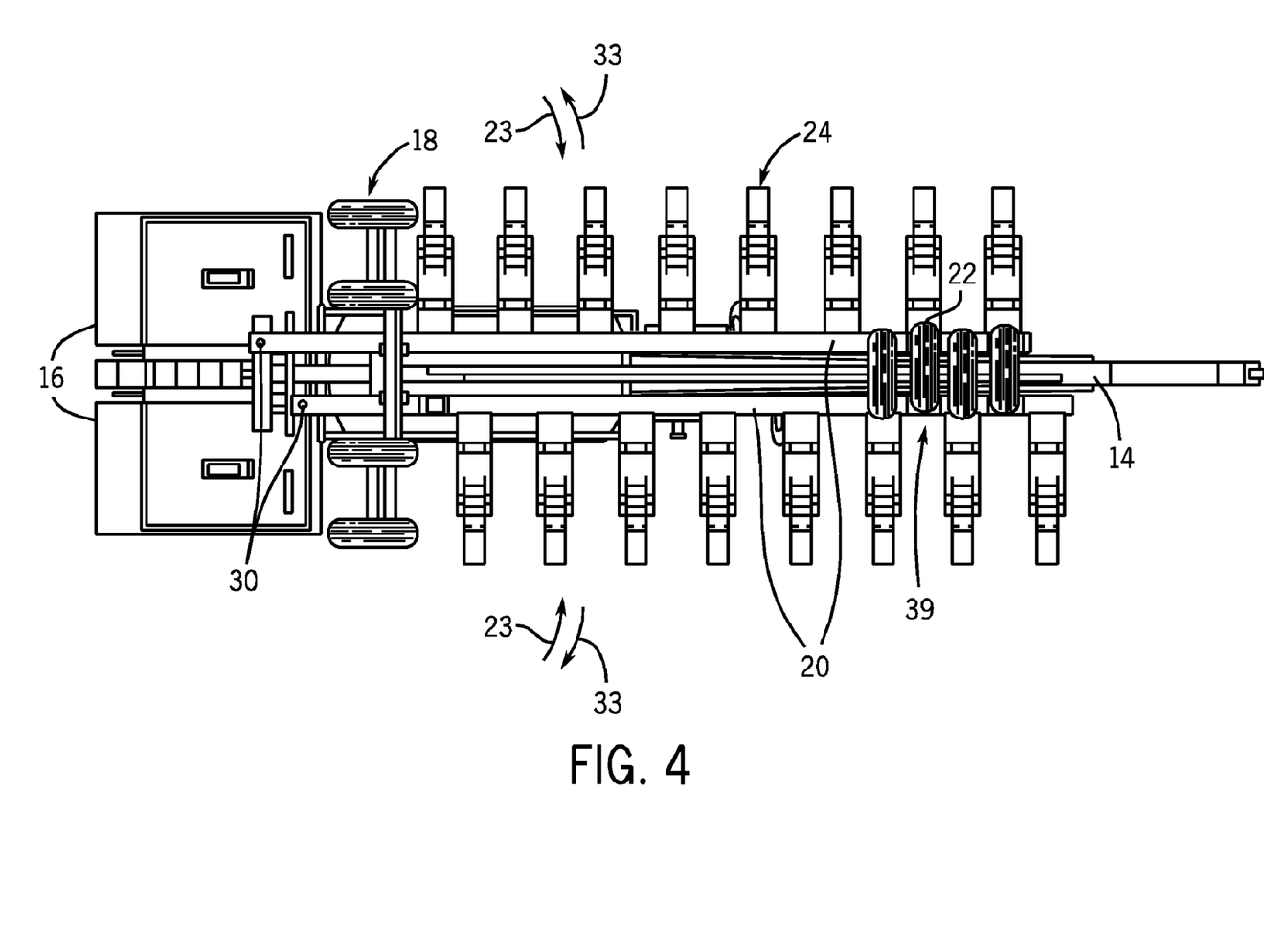
FIG. 4 is a bottom view of an embodiment of the agricultural implement in a transport position.

An embodiment of the planter implement 10 is shown in a transport position in FIG. 4. This view shows planter implement 10 from the bottom in the fully-folded or compacted transport position. In a presently contemplated embodiment shown, wing wheel assemblies 22 from opposite sides (e.g., left and right) are in an interleaved arrangement 39 below tow bar 14 when wing tool bars 20 are folded forward 23. The interleaved wing wheel assemblies 22 includes at least one opposing tool bar wheel adjacent to that wing's wheel. For example, when completely folded, the figure shows that the wheels alternate from front to back in the following fashion: left wing wheel, right wing wheel, left wing wheel, right wing wheel, left wing wheel, right wing wheel.

Central wheel assembly 18 is shown in an extended position 27 forward of seed tanks 16. Wing pivots 30 are located on wing tool bars 20, pivotally coupling each tool bar to the tow bar 14 assembly. Wing pivots 30 enable wing tool bars 20 to fold forward 23 and rearward 33 into a planting position. As discussed above, when in a fully-folded transport position, wing tool bars 20 may lock to tow bar 14 by hooks, latches, or other fasteners, thereby shifting the weight of wing tool bars 20 to the planter hitch assembly 12 and the attached tractor. This arrangement relieves stress and reduces the load on the folding mechanisms, actuators 21, and the pivot points 30 by coupling the outer portions of wing tool bars 20 to the tow bar 14.

Figure 5:
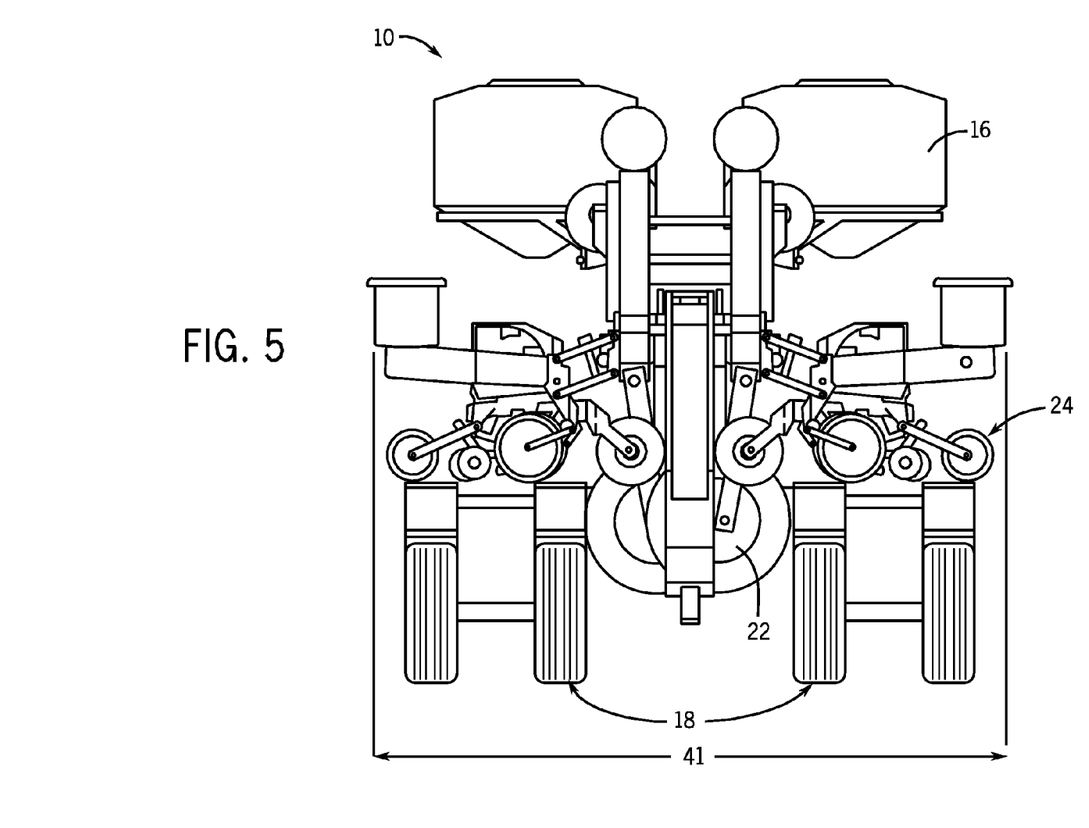
FIG. 5 a rear view of an embodiment of the agricultural implement in a transport position.

FIG. 5 illustrates an embodiment of planter implement 10 in a compacted transport position from a front view. The figure includes wing row units 24 as well as wing wheel assemblies 22. Central wheel assembly 18 is extended 27 and supports the weight of seed tanks 26, which are located above and behind central wheel assembly 18. In the extended position, the load of seed tanks 26 may be shifted rearward from planter hitch assembly 12, further reducing the load and stress on the hitch assembly 12. This shifting of the seed tanks 26 rearward may be accomplished by any suitable mechanism, such as a hydraulics assembly. The position of central wheel assembly 18 beneath seed tanks 26 may increase stability of the implement 10 during transport. As illustrated, implement width 41 is minimized due to the interleaving arrangement of wing wheel assemblies 22 as previously discussed.

Figure 6:
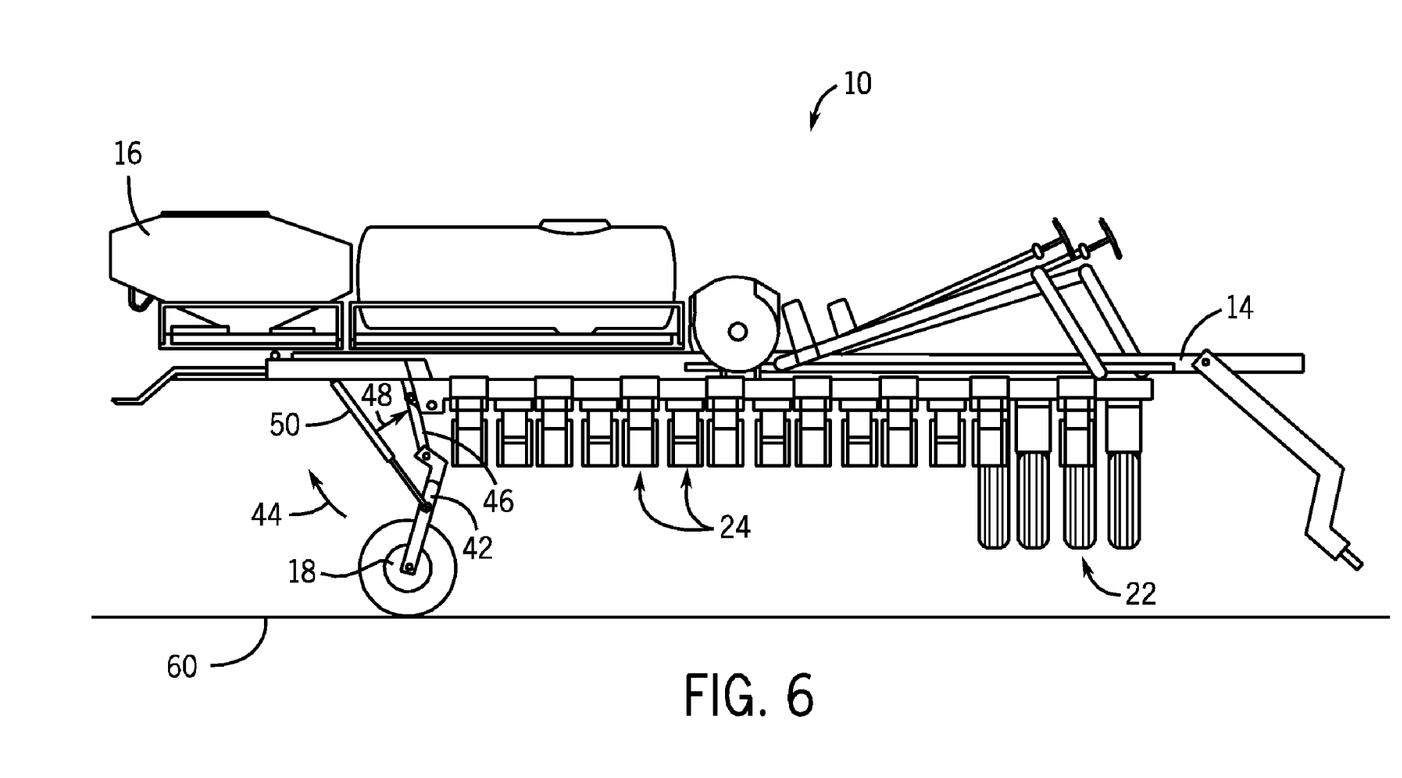
FIG. 6 is a side view of an embodiment of the agricultural implement in a transport position, illustrating the central wheel assembly in an extended position.

FIG. 6 shows a side view of an embodiment of planter implement 10 in a folded transport position. In the illustrated position, central wheel assembly 18 is in a fully-extended or deployed position, thereby lifting wing wheel assemblies 22 and wing row units 24 off the ground 60. As previously discussed, the components of central wheel assembly are extended in a scissor-type motion. Central wheel assembly 18 includes a plurality of members and joints to enable the scissor-type motion. For example, member 42 may be retracted upward, as indicated by arrow 44, as member 46 folds upward, indicated by arrow 48. This scissor-type retraction (or extension) motion is controlled by an actuator 50, which may be a hydraulic cylinder. When retracted, the compact arrangement of central wheel assembly 18 allows for flexibility in the placement of wing row units 24 along wing tool bars 20.

Wing tool bars 20 may include joints and/or linkages as well as actuators to enable row units 24 to adjust to the contours of a field. As shown previously in FIG. 3, the positioning of wing wheel assemblies 22 and central wheel assembly 18 forward of the tool bars 20 when the assemblies 22 are retracted 19 and the planter is in a planting or ground engaging position, reduces the spacing between row units 24, enabling an operator to further reduce the width between rows planted. Further, this arrangement provides more efficient use of tool bar space on the implement, maximizing the amount of rows to be planted in each pass across a field. The wheel arrangement may also improve stability, especially during transport by moving the seed tank load away from the hitch assembly, while reducing the folded width of the implement.

A number of variations may be envisaged for the arrangement described above. For example, a pair of tension members may be used to control the movement of central wheel assembly 18, with one being fitted on either side of the actuator to provide redundancy. Similarly, the tension member may be designed for removal from the arrangement, as in the illustrated embodiment, or may remain resident with the implement. In the latter case, the tension member may be hooked or otherwise configured to be swung down on one or more pins by pivotal movement on one of the pins, or on an additional structure. Moreover, in alternative configurations, the tension member may be secured to other components of the tool bar, brackets, or other elements than the pins used to secure the actuator pivotally to the implement.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A towable agricultural implement, comprising:
 a tow bar assembly pivotally coupled to two wing tool bars, each configured to fold forward and lock to a planter hitch assembly coupled to the tow bar assembly;
 a plurality of wing actuators coupled to the tow bar assembly and to each of the two wing bars, wherein the wing actuators are controllable to extend and fold the wing tool bars;
 a plurality of row units attached to the wing tool bars;
 a plurality of wing wheel assemblies coupled to the wing tool bars, wherein the wing wheel assemblies are configured to retract forward of the wing tool bars when the implement is in a ground engaging position and to extend toward the row units and below the wing tool bars in a first extended position;

a central wheel assembly coupled to the tow bar assembly, wherein the central wheel assembly comprises a scissor-type joint, and the central wheel assembly is configured to retract to a position forward of the wing row units when the implement is in a ground engaging position and to extend downward in a scissor-type motion when in a second extended position; and a seed tank assembly supported by the tow bar assembly and configured to shift rearwardly relative to the tow bar assembly to offset a load on the planter hitch assembly associated with the forward folding of the two wing tool bars;

wherein the scissor-type joint comprises:
 a first member having a first end;
 an axle disposed through the first end;
 a wheel rotatably coupled to the axle; and
 a second member having a first end pivotally coupled to a second end of the first member, and a second end pivotally coupled to the tow bar assembly.

2. The implement of claim 1, wherein the central wheel assembly comprises a plurality of central wheels and an actuator configured to move the central wheels in a downward and forward motion, away from the tow bar, to the second extended position.

3. The implement of claim 1, wherein the wing wheel assemblies each comprise a wing wheel configured to move in a downward and rearward motion, toward the row units.

4. The implement of claim 3, wherein the ground engaging position of the implement comprises a configuration having the wing wheels out of contact with the ground and the plurality of row units in contact with the ground.

5. The implement of claim 3, wherein the wing wheels are configured to be opposite the wing row units on each wing tool bar and in an interleaved position when the wing tool bars are folded forward and locked.

6. The implement of claim 1, wherein the wing actuators comprise hydraulic cylinders.

7. The implement of claim 1, wherein the tow bar assembly comprises a telescopic assembly.

8. A towable agricultural implement, comprising:
a central frame configured to be towed in operation, the frame including a hitch assembly;
a pair of wing tool bars, each pivotally coupled to the central frame and supporting a plurality of row units, wherein each wing tool bar is configured to fold forward and lock to the hitch assembly;
a plurality of wing actuators coupled to the central frame and to each of the two wing bars, wherein the wing actuators are controllable to extend and fold the wing tool bars;
a plurality of wing wheel assemblies coupled to the wing tool bars, wherein the wing wheel assemblies are configured to enable a range of motion from forward of the wing tool bars, extending downward under the wing tool bars, to raise the row units from a ground engaging position;
a central wheel assembly coupled to the central frame, wherein the central wheel assembly comprises a scissor-type joint, and the central wheel assembly is configured to enable a range of motion from a position forward of the row units, extending downward in a scissor-type motion, to raise the row units from a terrain; and a seed tank assembly supported by the central frame and configured to shift rearwardly relative to the central frame to offset a load on the hitch assembly associated with the forward folding of the pair of wing tool bars;

wherein the scissor-type joint comprises:
 a first member having a first end;
 an axle disposed through the first end;
 a wheel rotatably coupled to the axle; and
 a second member having a first end pivotally coupled to a second end of the first member, and a second end pivotally coupled to the central frame.

9. The implement of claim 8, wherein the central wheel assembly comprises a plurality of central wheels and an actuator configured to move the central wheels in a downward and forward motion, toward a tow coupling, to a first extended position.

10. The implement of claim 8, wherein the wing wheel assemblies each comprise a wing wheel configured to move from a ground engaging position to a second extended position.

11. The implement of claim 10, wherein the ground engaging position of the implement comprises a configuration having the wing wheels out of contact with the terrain and the plurality of row units in contact with the terrain.

12. The implement of claim 10, wherein the wing wheels are configured to be opposite the wing row units on each wing tool bar and generally centered on an axis running in the direction the implement is towed, when the wing tool bars are folded forward and locked.

13. The implement of claim 12, wherein the wing wheels are arranged in an interleaved manner when the wing tool bars are folded forward and locked.

14. The implement of claim 8, wherein the wing actuators comprise hydraulic cylinders coupled to the tow bar assembly and to the wing tool bars.

15. The implement of claim 8, wherein the central frame comprises a telescopic assembly.

16. The implement of claim 8, comprising a hydraulics assembly extending between the central frame and the seed tank assembly, wherein the hydraulics assembly is configured to shift the seed tank assembly in a rearward direction relative to the central frame.

17. An agricultural implement, comprising:
a central wheel assembly having a scissor-type joint configured to extend and retract in a scissor-type motion relative to a frame of the agricultural implement;
a first wing having a first lateral support, a first plurality of row units along and rearward of the first lateral support, and a first wheel forward of the first lateral support and not between any pair of adjacent row units of the first plurality of row units;
a second wing having a second lateral support, a second plurality of row units along and rearward of the second lateral support, and a second wheel forward of the second lateral support and not between any pair of adjacent row units of the second plurality of row units;
wherein the first and second wings are configured to fold toward one another; and
wherein the scissor-type joint comprises:
 a first member having a first end;
 an axle disposed through the first end;
 a wheel rotatably coupled to the axle; and
 a second member having a first end pivotally coupled to a second end of the first member, and a second end pivotally coupled to the frame.

18. The implement of claim 17, wherein the scissor-type joint comprises a hydraulic actuator coupled to the first member.

19. An agricultural implement, comprising:
   a central wheel assembly having a scissor-type joint configured to extend and retract in a scissor-type motion relative to a central frame of the agricultural implement;
   a pair of supports transverse to a forward direction of the implement;
   a plurality of row units along and rearward of the pair of supports;
   a plurality of wheels forward of the pair of supports, wherein each wheel is not between any pair of adjacent row units; and
   a seed tank assembly supported by the central frame and configured to shift rearwardly relative to the central frame to offset a load on a planter hitch assembly associated with forward folding of the pair of supports;
   wherein the scissor-type joint comprises:
      a first member having a first end;
      an axle disposed through the first end;
      a wheel rotatably coupled to the axle; and
      a second member having a first end pivotally coupled to a second end of the first member, and a second end pivotally coupled to the central frame.

20. The agricultural implement of claim 19, comprising a hydraulics assembly extending between the central frame and the seed tank assembly, wherein the hydraulics assembly is configured to shift the seed tank assembly in a rearward direction relative to the central frame.

21. The implement of claim 1, comprising a hydraulics assembly extending between the tow bar assembly and the seed tank assembly, wherein the hydraulics assembly is configured to shift the seed tank assembly in a rearward direction relative to the tow bar assembly.

22. The agricultural implement of claim 17, comprising a seed tank assembly supported by the frame and configured to shift relative to the frame to redistribute a load of the seed tank assembly.

* * * * *